United States Patent [19]

Bordwell

[11] Patent Number: 5,449,859

[45] Date of Patent: Sep. 12, 1995

[54] BRACKET FOR IN-FLOOR ELECTRICAL ACCESS MODULE

[75] Inventor: Mark Bordwell, Memphis, Tenn.

[73] Assignee: Thomas & Betts Corporation, Memphis, Tenn.

[21] Appl. No.: 9,184

[22] Filed: Jan. 26, 1993

[51] Int. Cl.⁶ ............................................. H02G 3/12
[52] U.S. Cl. ......................................... 174/48; 220/3.6; 248/27.1
[58] Field of Search ............... 174/48; 220/3.3, 3.4, 220/3.5, 3.6; 248/27.1, 231.9

[56] References Cited

U.S. PATENT DOCUMENTS

| | | | |
|---|---|---|---|
| 1,008,810 | 11/1911 | Freese . | |
| 1,795,224 | 3/1931 | Mangin | 220/3.4 |
| 1,917,450 | 7/1933 | Lademann | 248/231.9 |
| 1,930,242 | 10/1933 | Lademann | 248/231.9 |
| 1,943,237 | 1/1934 | Harrington | 248/231.9 |
| 2,209,057 | 7/1940 | Jackson | 248/231.9 |
| 2,231,153 | 2/1941 | Camiener | 24/73 |
| 2,286,898 | 6/1942 | Cover | 220/3.6 |
| 2,471,584 | 5/1949 | Richards | 248/71 |
| 2,767,945 | 10/1956 | Bragg | 248/27 |
| 3,362,667 | 1/1968 | Ginsburg | 248/27.1 |
| 3,476,343 | 11/1969 | Burrell | 220/3.6 X |
| 4,913,392 | 4/1990 | Swartzendrober et al. | 248/231.9 |
| 5,056,747 | 10/1991 | Kireta | 248/231.8 |

FOREIGN PATENT DOCUMENTS 2162239 1/1986 United Kingdom .

Primary Examiner—Leo P. Picard
Assistant Examiner—David Tone
Attorney, Agent, or Firm—Robert M. Rodrick

[57] ABSTRACT

A bracket supports an electrical access floor module in an opening in a raised floor. The bracket includes an elongate member having a first surface positionable on the upper surface of the floor, and a second surface extending perpendicular thereto into the floor opening. The second surface of the bracket includes a pair of bendable legs adapted to be bent under the floor to lie along the under surface of the floor. This securely supports the bracket in the floor opening. The second surface of the bracket further includes a screw receiving member for accommodating a screw inserted from within the access floor module to secure the module in the opening. The screw accommodating member prevents relative lateral movement of said access floor module with respect to said opening.

10 Claims, 2 Drawing Sheets

BRACKET FOR IN-FLOOR ELECTRICAL ACCESS MODULE

FIELD OF THE INVENTION

The present invention relates generally to in-floor boxes which permit access to electrical components running under the floor. More particularly, the present invention relates to a support bracket for securing an electrical access floor module in an opening in a raised floor.

BACKGROUND OF THE INVENTION

In the construction of buildings primarily of commercial design, it is well-known to use a raised floor in areas of heavy electrical equipment usage such as computer rooms and the like. A raised floor permits the running of electrical wire and cable, as well as other equipment, beneath the raised surface.

In order to provide access to the electrical wire and cable, an opening is cut through the floor at a desired location, and the wire and cable are run up into a box supported in the opening where it is terminated in conventional fashion with electrical receptacles to permit connection thereto of the electrical equipment supported by the floor. An in-floor access box or module is typically employed to house these receptacles and connections. These access floor modules are generally open-ended box-like containers which are inserted into an opening in the raised floor so that the open end is flush with the upper surface of the floor. A cover may be positioned over the open end to enclose the module.

In order to support the access floor module in the floor opening, brackets of various construction may be employed. The brackets presently in use are secured to the floor adjacent the opening with fastening hardware such as screws. The module is then fastened to the bracket to secure the box in the floor opening.

The brackets currently being used for such purposes require extensive installation time in that the bracket must be mechanically fastened to the floor about the opening using mounting hardware and tools to achieve such securement.

Further, quite often the raised floors have uneven floor thicknesses, and many of the available brackets do not compensate for the various thicknesses of the floor. This requires the installer to have multiple sized brackets or to relocate the access opening to a location where the floor thickness is more suitable.

In addition, with the brackets presently being used, it is often difficult to secure the module to the bracket once the bracket has been secured to the floor. The installer must insert a screw through the access module and then blindly align the screw with a tapped hole in the bracket. This further complicates the installation process.

It is desirable to provide a bracket for supporting an electrical access floor module in a floor opening which is easily securable to a raised floor and which will compensate for various floor thicknesses. It is also desirable to provide a bracket for supporting an access floor module which permits the module to be easily attached to the bracket.

SUMMARY OF THE INVENTION

It is an object of the present invention to provide an electrical access floor module which may be easily attached to a raised floor adjacent an opening therethrough.

It is a further object of the present invention to provide a bracket for supporting an access floor module in an opening of a raised floor.

It is a still further object of the present invention to provide an access floor module bracket which will compensate for various thicknesses in the floor in which it is installed.

In the efficient attainment of these and other objects, the present invention provides a bracket for supporting an electrical outlet box in a floor opening. The outlet box includes an open-ended interior compartment for positioning below an upper surface of the floor. The bracket includes an elongate member having a first surface positionable on the upper surface of the floor adjacent the opening. A second surface extends perpendicular to the first surface and into the opening. The second surface includes a bendable leg adapted to be bent in the direction of the first surface to lie along an under surface of the floor after the bracket is inserted into the opening. The second surface further includes a screw receiving surface for accommodating a screw passing from within the interior compartment of the box.

As more particularly described by way of the preferred embodiment herein, the bracket includes a pair of spaced apart bendable legs, each of the legs being adapted to be bent in the direction of the first surface. The legs are bendable continuously along the length thereof so that the legs may accommodate floors of varying thicknesses. The screw receiving surface is in the shape of an inverted V and is positioned between the bendable legs. The screw receiving surface accommodates a screw passing from within the interior compartment of the box in the apex of the V to prevent the box from moving laterally with respect to the bracket.

DETAILED DESCRIPTION OF THE PREFERRED EMBODIMENTS

Figure 1:
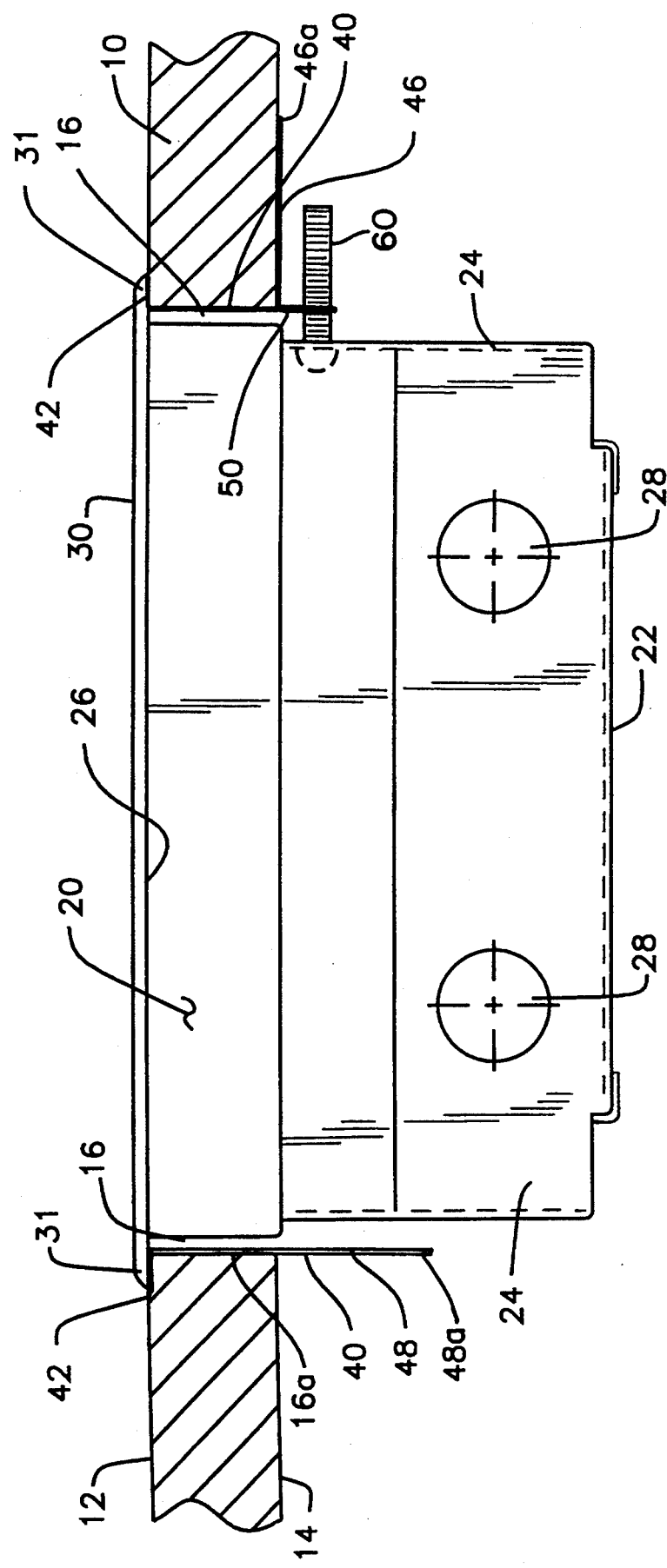
FIG. 1 shows an electrical access floor module supported within an opening in a raised floor by a pair of brackets of the present invention.

FIG. 1 shows a raised floor 10 having opposed upper and lower floor surfaces 12 and 14. Raised floor 10 is of the type typically used in commercial construction which is supported above a poured concrete floor or slab (not shown). Raised floor 10, which may be formed of well-known composite materials, is used to support electrical equipment, such as computers, above the poured floor. The raised floor 10 permits electrical wire and cable, as well as other equipment such as air conditioning ducts and the like (not shown), to be run beneath raised floor 10.

In order to provide connection access to the electrical wires and cables running beneath floor 10, an opening 16 is placed in raised floor 10, permitting the electrical wires and cables to be fed up through the opening for termination purposes. As is well-known in the electrical connection art, an access floor module 20 is employed in which connections to the electrical wires and cable may be made. Access floor module 20, referred to as an AFM, basically serves as an electrical junction or outlet box, permitting connection to wires and cables terminated therein.

Access floor module 20 is preferably formed of sheet metal, having a bottom wall 22 and sidewalls 24 extending upwardly from bottom wall 22. The upper end 26 of module 20 is open, providing an interior compartment 21, defined by bottom wall 22 and sidewalls 24. Sidewalls 24 include plural apertures 28 therethrough, which permit the insertion of wires and cables running beneath floor 10 into the interior compartment 21 of module 20. Electrical receptacles (not shown) of conventional construction may be supported within the interior compartment 21 of access floor module 20 to permit electrical connection thereto. The termination of electrical wires and cables to appropriate receptacles and the housing of the receptacle within module 20 are well-known in the electrical industry.

Access floor module 20 is supported within opening 16 such that upper end 26 lies substantially flush with upper surface 12 of raised floor 10. An appropriate cover 30 may be supported over upper end 26 to close off access floor module 20. Cover 30, which may also be formed of sheet metal, is secured to access floor module 20 in conventional fashion. Screws (not shown) may be inserted through cover 30 and into module 20 to provide such securement. The cover 30 may be opened to provide connection access to the receptacles housed in interior compartment 21. The outer expanse of cover 30 has a greater dimension than that of opening 16, such that when secured to access floor module 20, cover 30 prevents access floor module 20 from falling into opening 16.

Figure 2:
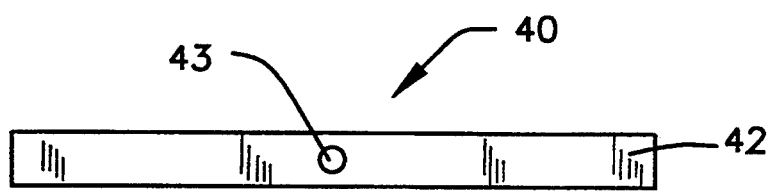
FIGS. 2 and 3 are top and front-plan views, respectively, of the electrical access floor module bracket of the present invention.
Figure 3:
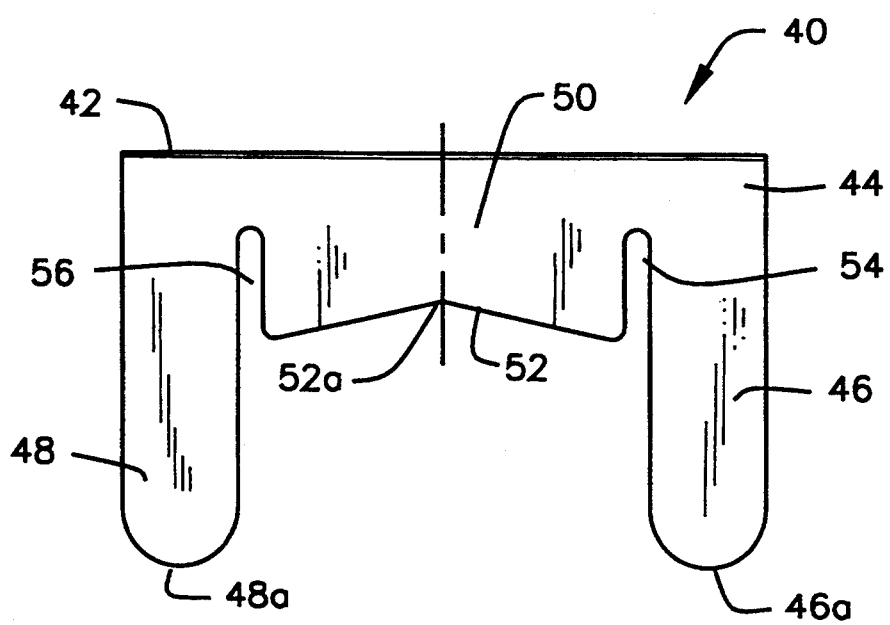

In order to further support and secure access floor module 20 in opening 16 of raised floor 10, a pair of identical brackets 40 are employed. Each bracket 40, shown in more detail in FIGS. 2 and 3, is a metallic member having a flat first surface 42 which is generally rectangular in shape. Depending from one longitudinal edge of first surface 42 is second surface 44, which extends substantially perpendicular to first surface 42. Second surface 44 includes a pair of spaced apart bendable legs 46 and 48. Legs 46 and 48 are elongate, having rounded distal extents 46a and 48a, respectively.

Second surface 44 further includes a centrally located screw accommodating element 50, which is coplanar with legs 46 and 48. Screw accommodating element 50 has an inverted V-shaped edge surface 52 with the apex 52a of the V being centrally located. Longitudinal side slots 54 and 56 separate central screw accommodating element 50 from each of legs 46 and 48.

Referring again to FIG. 1, the use of bracket 40 may be described. Bracket 40 is inserted into opening 16. First surface 42 is positioned along upper surface 12 of raised floor 10. First surface 42 includes a mounting aperture 43 therethrough which may be used to mechanically secure bracket 40 to floor 10. However, as is described in further detail herein, bracket 40 functions without the need for further external securement to floor 10. Second surface 44 of bracket 40 extends downwardly into opening 16 lying along a vertical edge 16a. Legs 46 and 48 are then bent inwardly in the direction of first surface 42 so that end extents 46a and 48a, respectively, bear against the lower floor surface 14 of raised floor 10. Legs 46 and 48 are bendable continuously along the length thereof so that bracket 40 may be attached to raised floors of various thicknesses. Many raised floors 10 have a waffle-shaped cross section. Depending upon where opening 16 is introduced into floor 10, the thickness of raised floor 10 may vary. Bendable legs 46 and 48 of bracket 40 permit the bracket to be used regardless where opening 16 is introduced into floor 10.

With first surface 42 extending along upper floor surface 12 and the distal extents 46a and 48a of legs 46 and 48 extending along lower floor surface 14, bracket 40 is prevented from moving in a vertical direction (FIG. 1) without need of further mechanical securement to floor 10. Further, once cover 30 is interposed over open upper surface 26 of module 20, the outer edge expanses 31 will lie over first surface 42 of bracket 40, further securing bracket 40 in opening 16.

Figure 4:
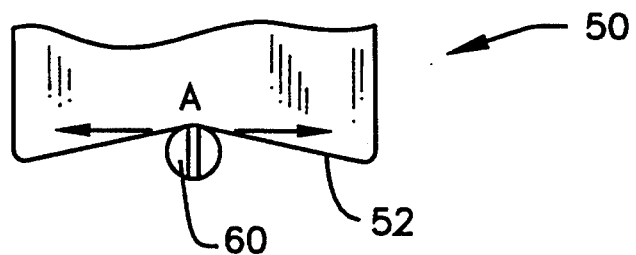
FIG. 4 is a fragmented view of a portion of the bracket of FIGS. 2 and 3, accommodating a fastening screw therein.

In order to prevent bracket 40 from moving laterally, a screw 60 is interposed through sidewall 24 of module 20. Screw 60 engages screw accommodating element 50 of bracket 40 by seating within apex 52a of edge 52. As shown in FIG. 4, screw 60 seated within apex 52a, is prevented from moving laterally in the direction of arrow A. Since, as above described, bracket 40 is prevented from moving vertically, the outwardly tapered edge walls of edge 52 prevent lateral movement as screw 60 can not move laterally along tapered edge 52 with vertically displacing bracket 40. Therefore, with screw 60 extending through sidewall 24 of module 20, relative lateral movement between bracket 40 and module 20 is prevented. Further, since the V-shaped edge 52 of screw accommodating element 50 is continuous, it is not critical exactly where screw 60 engages edge 52. While ideally screw 60 would seat within apex 52a, even if screw 60 where to engage a location slightly laterally spaced from apex 52a, significant lateral movement of bracket 40 would still be prevented. In fact, the bracket would have a self-seating feature, being capable of limited lateral movement only until screw 60 is seated properly in apex 52a. Once the screw 60 is received in apex 52a, further lateral movement is prevented. Therefore, unlike other brackets currently in use, there is no need to thread screw 60 into a blind hole tapped into the bracket.

As can be seen with respect to FIG. 1, use of two brackets 40 in the manner shown will provide for secure accommodation of access floor module 20 within opening 16 of raised floor 10.

Various changes to the foregoing described and shown structures would now be evident to those skilled in the art. Accordingly, the particularly disclosed scope of the invention is set forth in the following claims.

I claim:

1. A bracket for supporting an electrical outlet box in a floor opening, said outlet box including an open-ended interior compartment for positioning below an upper surface of said floor and a cover for closing said open end of said compartment, said bracket comprising:

an elongate member having a first surface positionable on the upper surface of said floor adjacent said opening, a second surface perpendicular to said first surface having a pair of bendable legs, each leg being adapted to be bent in the direction of said first surface to lie along an under surface of said floor after said member is inserted into said opening, said second surface further including screw receiving means for accommodating a screw inserted from within said interior compartment of said box, said screw receiving means including a screw receiving member positioned between said bendable legs, said screw receiving member having an inverted V-shaped notch which accommodates said screw therein.

2. A bracket in accordance with claim 1 wherein said bendable legs are elongate and are transversely bendable along the length thereof.

3. In combination, an access floor module and a bracket for supporting said module within an opening in a raised floor comprising:

said access floor module including a container having a bottom wall, sidewalls and an open upper end for positioning substantially flush with an upper surface of said floor;

said bracket including a first bracket member for positioning along said upper surface of said floor adjacent said opening, a second bracket member depending from said first bracket member and being of extent to extend into said floor opening, said second bracket member including a pair of spaced apart bendable legs for bending around an under surface of said floor for supporting said bracket on said floor about said opening and a module support member intermediate said spaced apart legs; and a fastening member insertable through one of said sidewalls of said module from within said container and engagable with said module support member to fixedly position said module within said opening.

4. A combination in accordance with claim 3 wherein said second bracket member extends from said first bracket member at approximately 90°.

5. A combination in accordance with claim 4 wherein said spaced legs are elongate and are bendable so as to have portions which extend parallel to said first bracket member.

6. A combination in accordance with claim 5 wherein said fastening member includes a threaded screw.

7. A combination in accordance with claim 6 wherein said module support member includes a surface for receipt of said threaded screw.

8. A combination in accordance with claim 6 wherein said module support member includes a planar surface having an inverted V-shaped notch for accommodating said screw in said notch.

9. A combination in accordance with claim 8 further including a cover for positioning over said open end of said access floor module and said first bracket member.

10. A combination in accordance with claim 3 further including plural said brackets for supporting said module.

* * * * *